US012326129B1

(12) United States Patent
Hunter et al.

(10) Patent No.: US 12,326,129 B1
(45) Date of Patent: Jun. 10, 2025

(54) ROTATABLE BYPASS ASSEMBLY FOR FUEL SYSTEM

(71) Applicant: S & S Diesel Motorsport LLC, Seymour, IN (US)

(72) Inventors: Dathan Wayne Hunter, Columbus, IN (US); Luke Joseph Langellier, Columbus, IN (US); Andrew Joseph Stauffer, Brownstown, IN (US); Ian Wayne McGiffen, Hartsville, IN (US); Andre Joseph Dusek, Brownstown, IN (US); Ryan Robert Reiser, Denver, NC (US)

(73) Assignee: S & S Diesel Motorsport LLC, Seymour, IN (US)

( * ) Notice: Subject to any disclaimer, the term of this patent is extended or adjusted under 35 U.S.C. 154(b) by 0 days.

(21) Appl. No.: 18/665,015

(22) Filed: May 15, 2024

(51) Int. Cl.

| | |
|---|---|
| ***F02M 59/44*** | (2006.01) |
| ***F02M 59/36*** | (2006.01) |
| ***F02M 63/02*** | (2006.01) |

(52) U.S. Cl.
CPC .......... *F02M 59/442* (2013.01); *F02M 59/36* (2013.01); *F02M 63/0265* (2013.01)

(58) Field of Classification Search
CPC ... F02M 63/0265; F02M 59/36; F02M 59/442
See application file for complete search history.

(56) References Cited

U.S. PATENT DOCUMENTS 10,280,876 B2 * 5/2019 Lee ........................ F16K 15/023
2002/0148509 A1 * 10/2002 Tine, Jr. ................. B60K 15/06
137/553

FOREIGN PATENT DOCUMENTS

CN 107110091 A * 8/2017 ............. F02M 55/02
EP 0171878 A1 * 2/1986

* cited by examiner

*Primary Examiner* — Kevin A Lathers
(74) *Attorney, Agent, or Firm* — Dority & Manning, P.A.

(57) ABSTRACT

A rotatable bypass assembly for use with a high-pressure fuel system is provided. The rotatable bypass assembly can include a collar with a first mounting point. The first mounting point can include a first stop face and a second stop face. The rotatable bypass assembly has a bypass block with a fuel barb. The fuel barb of the bypass block is rotatable between, at least, the first stop face and the second stop face.

19 Claims, 6 Drawing Sheets

ROTATABLE BYPASS ASSEMBLY FOR FUEL SYSTEM

FIELD

The present disclosure relates generally to fuel systems and, more particularly, to a rotatable bypass assembly for use with a high-pressure fuel pump. The rotatable bypass assembly that is the subject of the present disclosure relates to protecting a diesel fuel system from damage caused by contaminants and contaminated fuel in the event of a mechanical failure of a high-pressure fuel pump, without regard to the specific vehicle or engine application in which the high-pressure fuel pump is installed and without the need for an application specific or vehicle specific bypass block. In that regard, the present disclosure relates to a universal rotatable bypass assembly for use with a high-pressure diesel fuel system.

BACKGROUND

Certain internal combustion engines can utilize fuel systems which deliver fuel under high pressures to the engine combustion chambers. For example, internal combustion engines can utilize direct fuel injection systems which require that fuel be delivered at high pressures (e.g., approximately 2000 bar or 29,000 psi or more) to the combustion chambers of the engine. The use of high-pressure fuel systems on internal combustion engines can have advantages such as increased fuel efficiency, increased engine power output, reduction of emissions, and/or facilitate a more efficient combustion process. Delivery of clean and uncontaminated fuel is important for proper operation and longevity of high-pressure fuel systems and proper performance of an engine utilizing a high-pressure fuel system.

In some applications, e.g. diesel engines, high-pressure common rail fuel systems can be used. Common rail systems distribute diesel fuel, under high pressures, to engine combustion chambers using one or more fuel injectors. Diesel fuel is distributed, under high pressure, to the fuel injectors through a high-pressure accumulator or rail. Diesel fuel is placed under high-pressure and is supplied to the fuel rail by a high-pressure fuel pump. A high-pressure fuel pump can be constructed using various designs. For instance, a high-pressure fuel pump can consist of a pump camshaft, which is driven by a belt, chain, cogwheel or gear. The camshaft can move other mechanical components, such as a pump piston, to pump fuel and generate or place the fuel under the required high pressure.

Drawbacks exist with respect to high-pressure fuel systems and high-pressure fuel pumps. More specifically, in a high-pressure fuel system, the fuel (e.g., diesel fuel) may not be routed only or directly between a fuel supply (e.g., fuel tank) and the common rail or fuel injectors. Rather, the diesel fuel may be used to lubricate and cool certain mechanical components of the high-pressure fuel pump (e.g., the cam shaft, piston, roller tappet), and then the diesel fuel can be fed into other portions of the fuel system (e.g., common rail and injectors) and the engine. Drawbacks in this fuel system design exist because mechanical components (e.g. a pump camshaft, roller tappet, pump piston) or other components of a high-pressure fuel pump can become worn, deteriorate, or suffer catastrophic failure which can cause metal particles or other materials to contaminate the high-pressure fuel pump, contaminate the fuel within the high-pressure fuel pump (e.g., the fuel present within the pump, which is being used to lubricate and/or cool the pump), contaminate other components of the high-pressure fuel system, and/or contaminate or damage components of the internal combustion engine or vehicle in or on which the high-pressure fuel system is installed. After contaminants resulting from the failure or deterioration of any component of a high-pressure fuel pump are present in the fuel within the high-pressure fuel system, the contaminants and contaminated fuel can be distributed (i.e., pumped) throughout the fuel system and can damage some or all of the components of the fuel system and/or cause extensive damage to the internal combustion engine. Damage arising from a failed high-pressure fuel pump can partially or completely disable an engine or vehicle and necessitate costly repairs, such as the replacement of some or all aspects of the fuel system. For example, many modern pickup trucks fitted with diesel engines using common rail diesel fuel systems can cost more than $10,000 to repair after the failure of a high-pressure fuel pump and require many hours of labor to repair. Wear, deterioration, or failure of a high-pressure fuel pump, and/or contamination of a fuel system, may not be detectable by an owner or operator of a vehicle or engine until a catastrophic failure of the high-pressure fuel pump occurs and/or after severe damage has been caused to other vehicle or engine components, such as fuel lines, fuel injectors, and fuel rails, among others.

A filtration system can be added or retrofitted on to a fuel system to filter, clean out, or trap contaminants that enter a fuel system. A filtration system can reduce the potential for, or in some instances prevent, damage that may result from a high-pressure fuel pump failure. However, it is not practical to filter fuel that is under high pressure. Existing approaches to filtration systems for fuel systems, particularly add-on or retrofit systems, can present certain challenges. For example, high pressure fuel systems are used in a wide range of applications, including a wide variety of vehicles or machines (e.g., passenger vehicles, light duty trucks, boats, and construction equipment), or in a wide variety of engines (e.g., gasoline or diesel). Therefore, application specific (e.g., vehicle specific, engine specific or fuel pump specific) filtration systems must be designed and manufactured for each application. The use of application specific filtration systems results in drawbacks such as manufacturing inefficiencies, higher costs, and in some cases, the absence of filtration systems for uncommon applications (e.g., old, or rare vehicles or engines).

For these reasons, it would be advantageous to have a filtration system for high-pressure diesel fuel systems, which includes a bypass assembly that is universal or readily adaptable across many applications, including many vehicles and/or engine applications. It would be advantageous to have a bypass assembly for a fuel filtration system that is not limited to or directed to only a single application (e.g., limited to only a specific vehicle, a specific engine, a specific fuel system or a specific high pressure fuel pump).

BRIEF DESCRIPTION

Aspects and advantages of embodiments of the present disclosure will be set forth in part in the following description, or may be learned from the description, or may be learned through practice of the embodiments.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
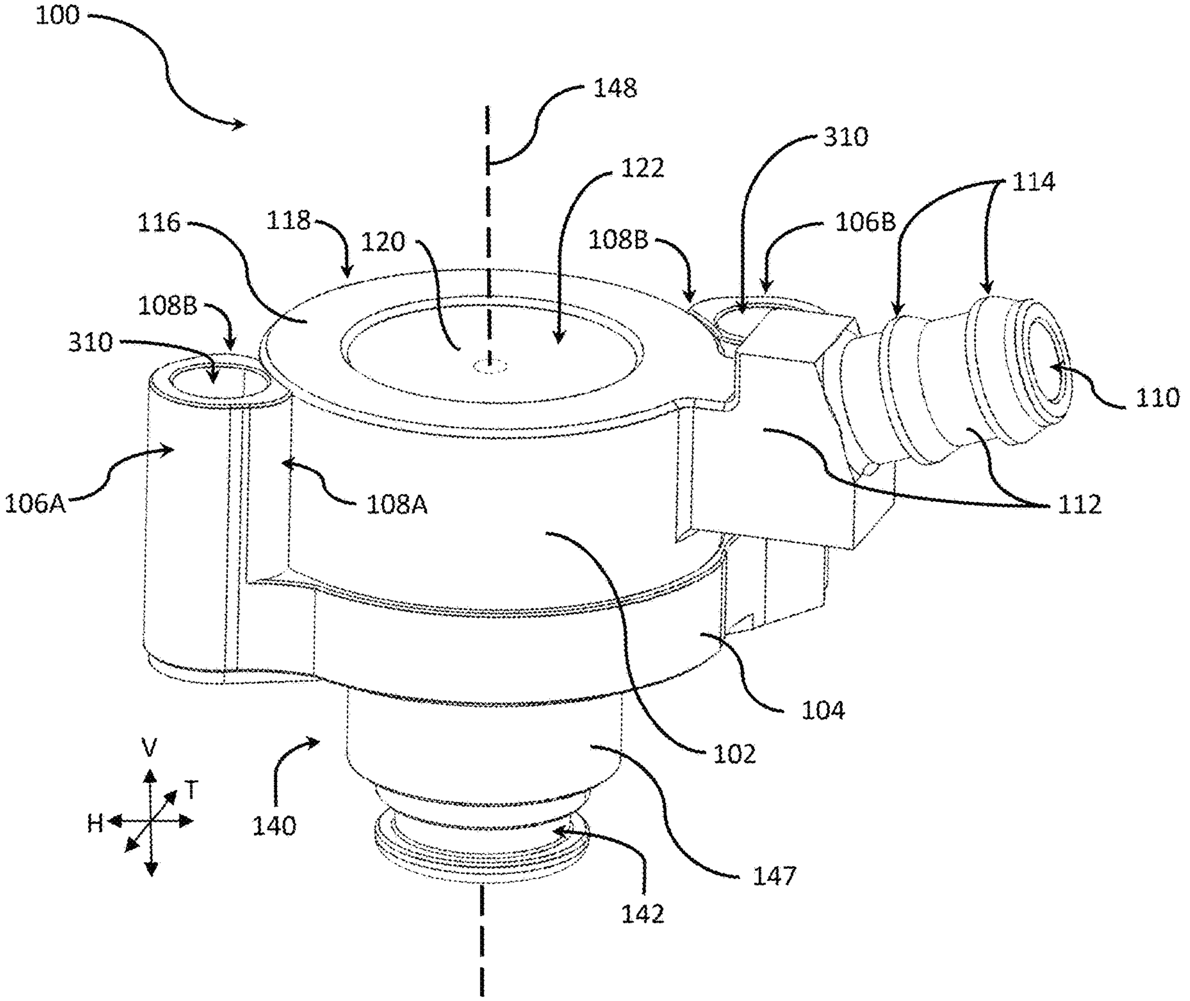
FIG. 1 depicts a rotatable bypass assembly according to exemplary embodiments of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The singular forms "a", "an", and "the" include plural references unless the context clearly dictates otherwise. As used herein, terms of approximation, such as "approximately," "substantially," or "about," refer to being within a five percent margin of error.

Aspects of the present disclosure are directed to a rotatable bypass assembly for use with a high-pressure fuel pump (sometimes referred to herein as the "HPFP") or high-pressure fuel system. The rotatable bypass assembly of the present disclosure can be used to block the existing fuel supply passage of a high-pressure fuel pump. The fuel supply passage of a high-pressure fuel pump is a fluid passage that is part of and/or located within a fuel pump that supplies fuel to or permits a flow of fuel to a pumping chamber and then to a common rail and/or fuel injectors of a high-pressure fuel system, after said fuel has first passed through the case of the HPFP which contains the movable mechanical components (e.g., the cam shaft, piston, roller tappet), and/or come into fluid communication with said mechanical components, driving a pumping element of the HPFP. Fuel supplied to the pumping chamber of the HPFP is placed under high pressure in said pumping chamber and then delivered to the combustion chamber(s) of the engine by way of a common rail and/or fuel injectors.

When the bypass block of the rotatable bypass assembly of the present disclosure is not used with a high-pressure fuel pump (e.g., attached to or otherwise in fluid communication with the fuel supply passage of a HPFP), the fuel supply passage of a HPFP is in fluid communication with, at least, the pumping chamber, the common rail of the high-pressure fuel system and/or in fluid communication with certain movable mechanical components located within the case of the high-pressure fuel pump (e.g., the cam shaft, piston, roller tappet). In this way, fuel is first in fluid communication with the movable mechanical components located within the case of the high-pressure fuel pump (e.g., the cam shaft, piston, roller tappet), and acts as a lubricant for or provides lubrication to said movable mechanical components of the high-pressure fuel pump, before the said fuel enters, is in fluid communication with, or is delivered to the pumping chamber.

The bypass block of the rotatable bypass assembly of the present disclosure can block or obstruct the existing fuel supply passage of a high-pressure fuel pump (e.g., a Bosch® CP4 pump) or otherwise stop, break, or interrupt the fluid communication existing between the fuel supply passage of a high-pressure fuel pump and, at least, the pumping chamber of the HPFP and/or the common rail of the high-pressure fuel system. In this way, the bypass block of the rotatable bypass assembly of the present disclosure can be used avoid, stop, block, or prevent combustion fuel (e.g., fuel being supplied to the pumping chamber and, in turn, the internal combustion engine through a common rail and fuel injectors) from mixing with, being in fluid communication with and/or being contaminated by the lubricating fuel (e.g., fuel being used to lubricate and/or cool certain movable mechanical components located within the case of the high-pressure fuel pump such as the cam shaft, piston, and roller tappet, of the HPFP), without said lubricating fuel first being filtered by or passed through one or more filters.

The bypass block of the rotatable bypass assembly of the present disclosure can be used to facilitate the supply of combustion fuel to an internal combustion engine from a fuel tank, without said combustion fuel being in fluid communication with the lubricating fuel at or within the HPFP, without or before said lubricating fuel is filtered by or passed through one or more fluid filters. The rotatable bypass assembly of the present disclosure can also be used to facilitate filtration of the lubricating fuel, by preventing said lubricating fuel from mixing with the combustion fuel or said lubricating fuel returning to the fuel tank (via a return fuel line), without said lubricating fuel first being routed through or filtered by a fuel filter or other fluid filter. In this way, the rotatable bypass assembly of the present disclosure avoids or prevents the mixing of unfiltered lubricating fuel with or otherwise being in fluid communication with filtered fuel, combustion fuel, and/or fuel stored within a fuel tank.

Aspects of the present disclosure are directed to a rotatable bypass assembly for use with a high-pressure fuel pump. The rotatable bypass assembly includes a bypass block and a collar. The collar can be mechanically attached to the high-pressure fuel pump by or through one or more mounting points. However, in some embodiments, the collar does not comprise or require mechanical fasteners or threading to secure the rotatable bypass assembly to the high-pressure fuel pump, that is separate the mechanical fasteners or threading used to attach a fuel contact actuator to a high-pressure fuel pump, when the rotatable bypass assembly is not present. Each of the one or more mounting points includes one or more stop faces. The bypass block of the rotatable bypass assembly is rotatable relative to the collar. The bypass block can be turned or rotated, on an axis extending in a vertical direction through the center of the bypass block. In this way the fuel supply passage of the bypass block can be placed or angled in a plurality of locations between the stop faces of the mounting points of the collar. In this way, the rotatable bypass block allows for use of the rotatable bypass assembly on a plurality of applications, including a plurality of high-pressure fuel pumps, vehicles, engines, and fuel systems. In this way, the bypass block of the rotatable bypass assembly of the present disclosure can be used to prevent delivery of unfiltered fuel (i.e., diesel fuel) directly to the common rail and fuel injectors without regard to the specific vehicle or application in which the high-pressure fuel system is located.

Aspects of the present disclosure are directed to a rotatable bypass assembly for use with a high-pressure fuel pump. The rotatable bypass assembly can include a collar with a first mounting point. The first mounting point can include a first stop face and a second stop face. The rotatable bypass assembly can also include a bypass block with a fuel barb. The fuel barb of the bypass block is rotatable between, at least, the first stop face and the second stop face. The bypass block and fuel barb of the rotatable bypass assembly can be integrally formed.

The rotatable bypass assembly can also include a second mounting point including a first stop face and a second stop face. The rotatable bypass assembly and/or collar can include a front edge and a rear edge. The fuel barb can be rotatable along the front edge between the first stop face of the first mounting point and the first stop face of the second mounting point, and the fuel barb can also be rotatable along the rear edge between the second stop face of the first mounting point and the second stop face of the second mounting point.

The first mounting point and second mounting point can be directly or approximately opposed from one another across collar, based on a centerline which divides the collar into half. The collar can include a collar alignment surface and the bypass block can include a block alignment surface. The collar alignment surface and block alignment surface can be in rotatable contact. The bypass block can include a top surface and the first mounting point and second mounting point each form protrusions extending from collar and said first mounting point and second mounting point include a top. The top surface of bypass block is level with the top of, at least, one of the first mounting point or second mounting point when the block alignment surface and collar alignment surface are in rotatable contact.

The collar can also include a bottom and a mounting protrusion extending from said bottom. The rotatable bypass assembly can also include a fuel delivery nozzle in fluid communication with a fuel reception chamber located within the rotatable bypass block and the fuel delivery nozzle includes a barrier wall located or positioned above a sealing groove. The barrier wall includes a surface that is operable to or configured to form a liquid-tight seal against a case of a high-pressure fuel pump and obstruct an internal fuel supply passage located with the high-pressure fuel pump. The rotatable bypass assembly can also include a fuel delivery nozzle in fluid communication with a fuel reception chamber located within the rotatable bypass block and the fuel delivery nozzle can include a barrier wall located or positioned above a sealing groove. The rotatable bypass assembly can have a bypass block mounting protrusion extending from block alignment surface and the bypass block mounting protrusion is aligned with or level with collar mounting protrusion when the block alignment surface and collar alignment surface are in rotatable contact. The first mounting point can also include a cutout. The cutout can extend from the first stop face of the first mounting point into a mounting aperture located within the first mounting point.

Aspects of the present disclosure are also directed to a rotatable bypass block for use with a high-pressure fuel pump. The rotatable bypass block includes a body including a top surface, a block alignment surface and an outer wall extending from top surface to block alignment surface. The bypass block also includes a fuel reception chamber within the body, a fuel barb including a combustion fuel supply passage, wherein said combustion fuel supply passage is in fluid communication with said fuel reception chamber and a fuel delivery nozzle in fluid communication with the fuel reception chamber, wherein the fuel delivery nozzle includes a barrier wall located or positioned above a sealing groove.

The barrier wall includes a surface operable to or configured to form a liquid-tight seal against a case of a high-pressure fuel pump and obstruct an internal fuel supply passage located with the high-pressure fuel pump. The body of bypass block, the fuel barb, and the fuel delivery nozzle are integrally formed. The fuel reception chamber is a void which can receive or is configured to receive a valve end of a fuel control actuator. The bypass block body forms a cylinder. The rotatable bypass block may also include a bypass block mounting protrusion extending from block alignment surface.

Referring now to the figures, example aspects of the present disclosure will be discussed in greater detail.

Referring generally to FIGS. 1 through 8. FIG. 1 depicts a rotatable bypass assembly 100 according to exemplary embodiments of the present disclosure. Rotatable bypass assembly 100 defines a vertical direction V, a lateral direction L, and a transverse direction T. The vertical, lateral, and transverse directions V, L, and T are mutually perpendicular and form an orthogonal direction system.

Figure 2:
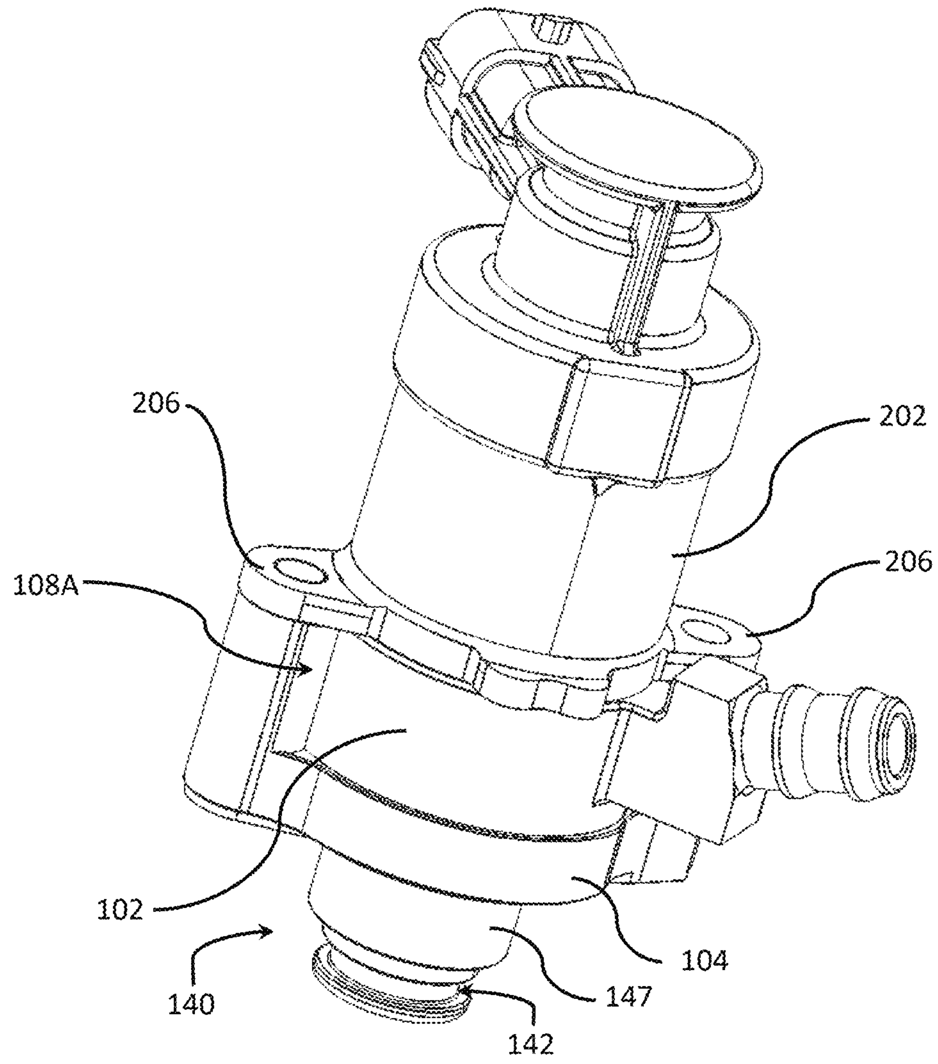
FIG. 2 depicts the rotatable bypass assembly of FIG. 1, shown with a fuel control actuator for context.
Figure 3:
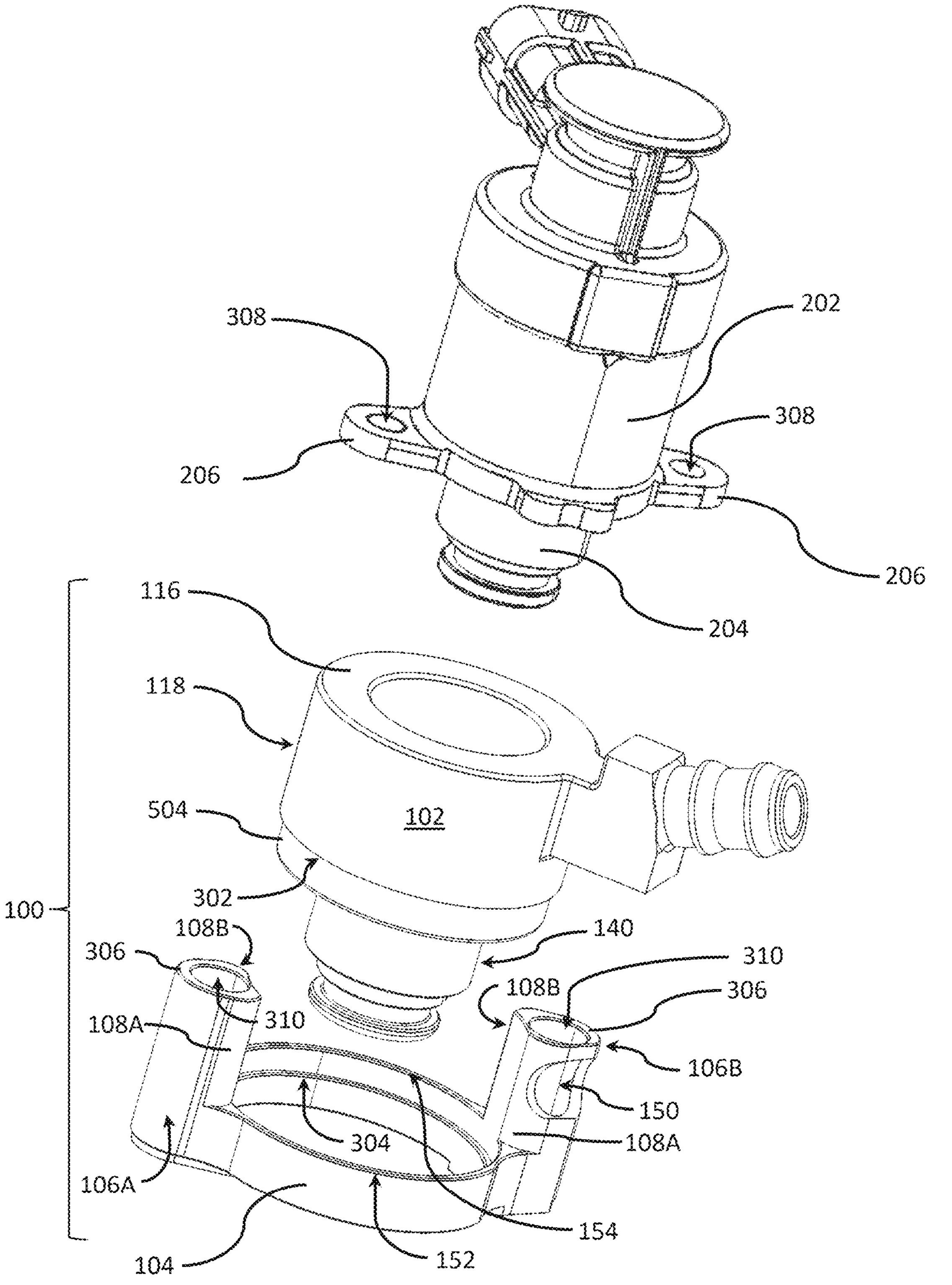
FIG. 3 depicts an exploded view of the rotatable bypass assembly of FIG. 2, shown with a fuel control actuator for context.
Figure 4:
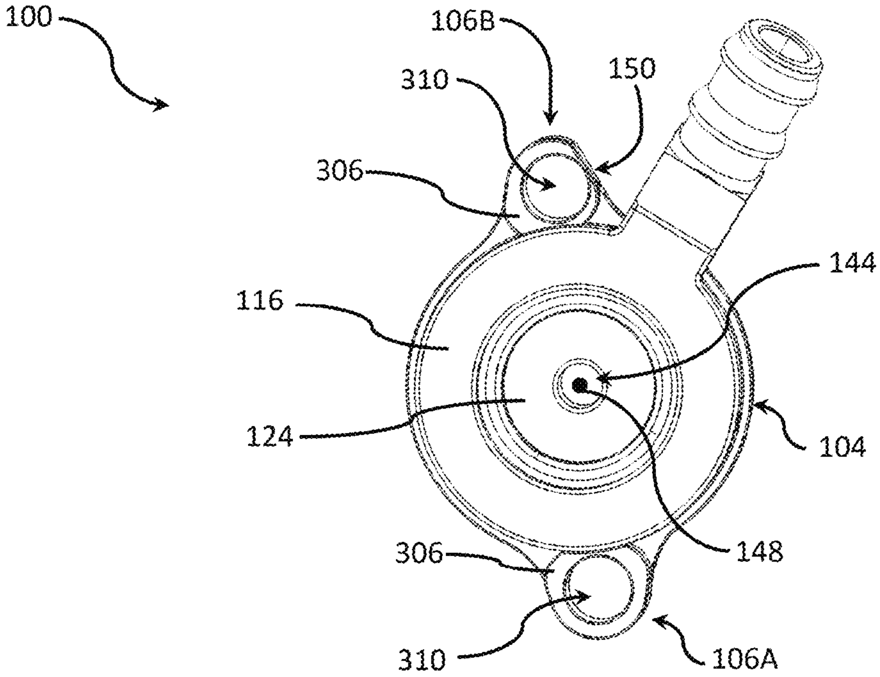
FIG. 4 depicts a top view of the rotatable bypass assembly of FIG. 1.
Figure 5:
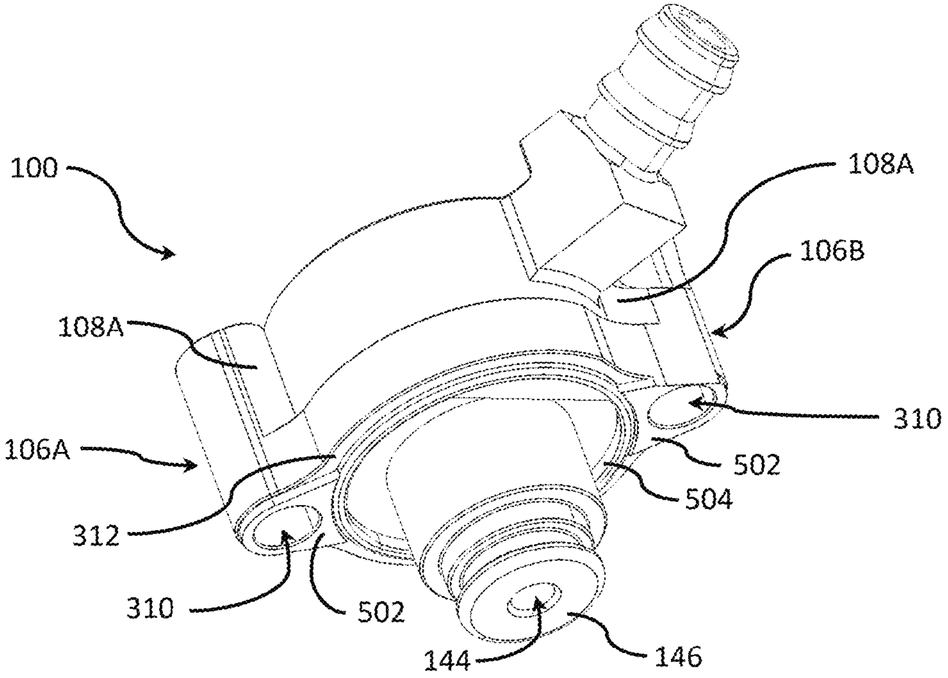
FIG. 5 depicts a bottom perspective view of the rotatable bypass assembly of FIG. 1.
Figure 6:
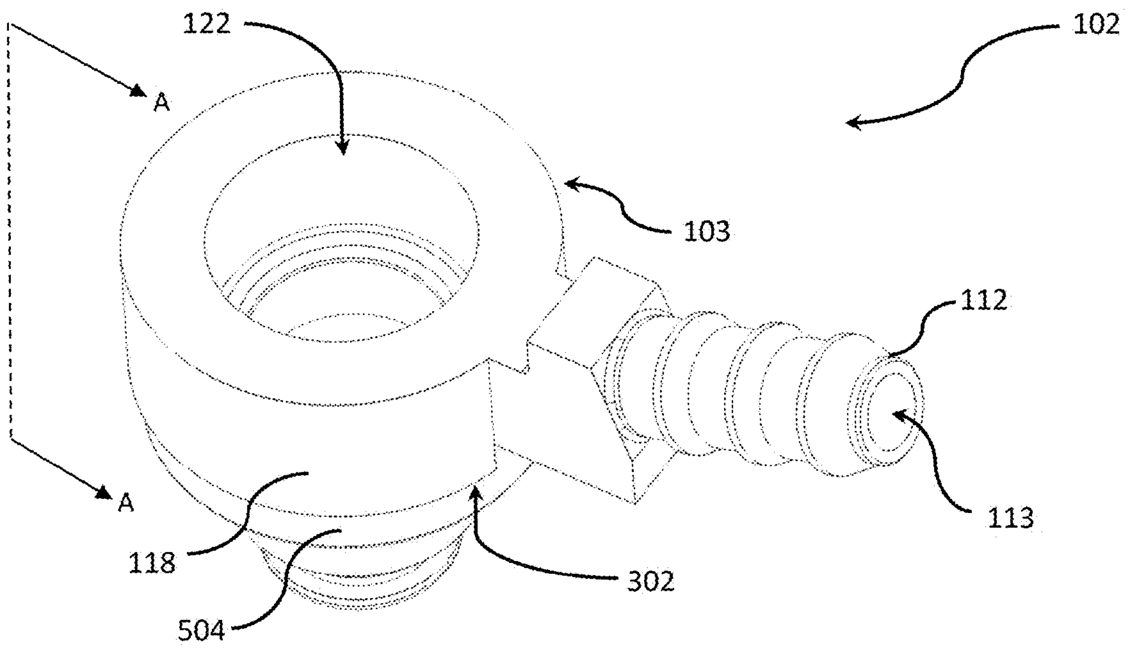
FIG. 6 depicts a top perspective view of the bypass block of the rotatable bypass assembly of FIG. 1.
Figure 7:
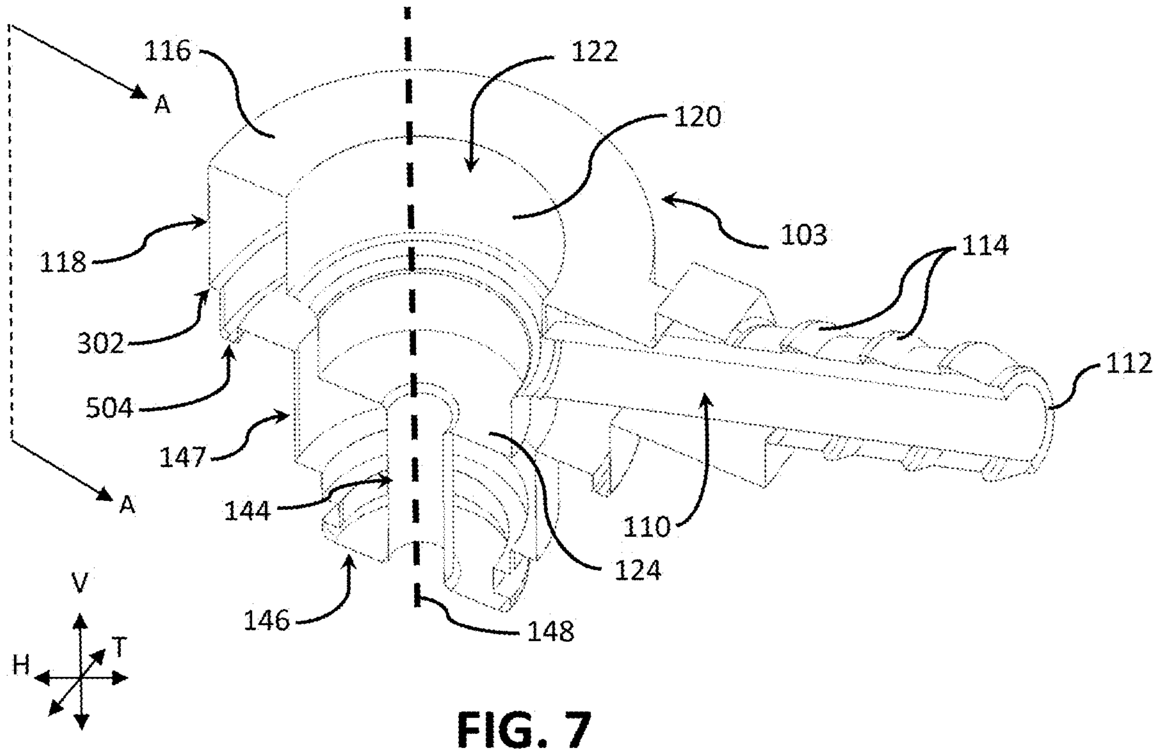
FIG. 7 depicts a partial top perspective view of the bypass block of FIG. 7 taken along the A-A section line of FIG. 6
Figure 8:
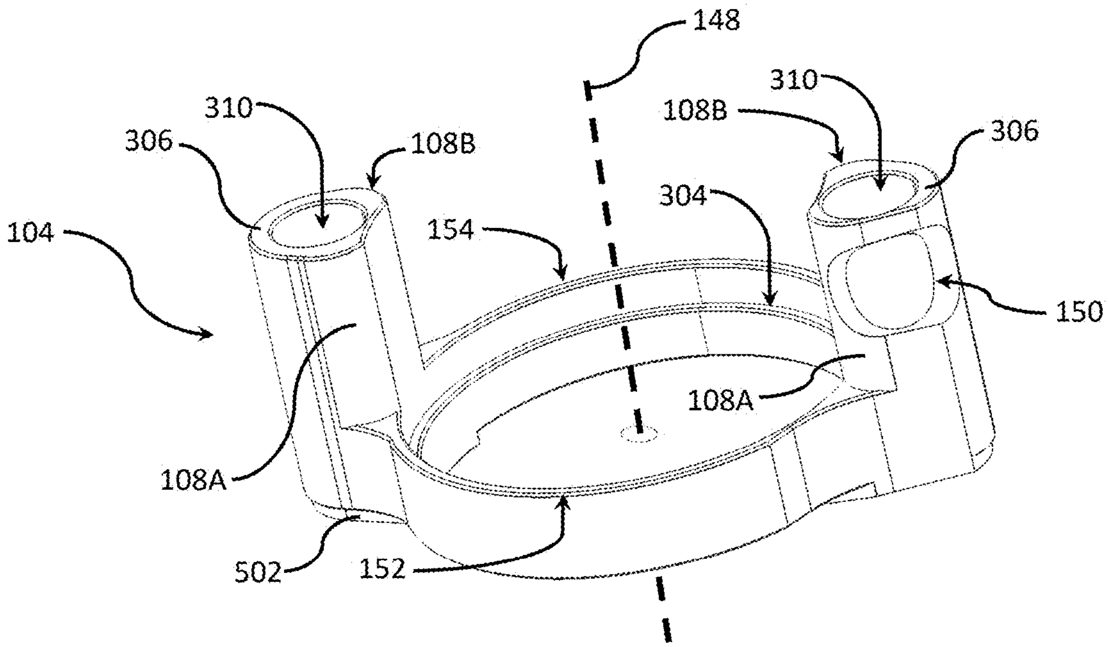
FIG. 8 depicts a top perspective view of the collar of the rotatable bypass assembly of FIG. 1.

FIG. 2 depicts the rotatable bypass assembly 100, shown with a fuel control actuator 202 (also known as an inlet metering valve) for context. FIG. 3 depicts an exploded view of the rotatable bypass assembly 100 of FIG. 2, shown with a fuel control actuator 202 for context. FIG. 4 depicts a top view of the rotatable bypass assembly 100. FIG. 5 depicts a bottom perspective view of the rotatable bypass assembly 100. FIG. 6 depicts a top perspective view of the bypass block 102 of the rotatable bypass assembly 100. FIG. 7 depicts a partial top perspective view of the bypass block 102 taken along the A-A section line of FIG. 6. FIG. 8 depicts a top perspective view of the collar 104 of the rotatable bypass assembly 100.

The rotatable bypass assembly 100 includes a bypass block 102 and a collar 104. The bypass block 102 can be integrally formed or machined from a single piece of material, such as a billet of aluminum. In other embodiments bypass block 102 can be comprised of multiple or separable components which are joined together or affixed through welding, press fit, gluing, or other known method of assembly or attachment. Bypass block 102 and/or collar 104 can be formed or machined from metal, such as aluminum or steel, or formed from any other material which can be exposed to or come in contact with fuel without failure or degradation.

Rotatable bypass assembly 100, can include one or more mounting points such a first mounting point 106A and second mounting point 106B. Mounting points 106A and 106B are attached to or integrally formed with collar 104. One or both the mounting points 106A and 106B include a mounting aperture 310. As shown in FIG. 1, the one or more mounting points 106A and 106B can be a protrusion extending, upward in a vertical direction V, from collar 104. Mounting aperture 310 can be a channel or void extending, in a vertical direction V, through one or both mounting points 106A and 106B. Collar 104 and mounting points 106A and 106B can be integrally formed or can be multiple or separable components which are joined together or affixed through welding, press fit, gluing, or other known method of assembly or attachment. Collar 104 can be mechanically attached to a high-pressure fuel pump (not shown in FIGS. 1 to 8) by passing mechanical fasteners (e.g., bolts, screws, rivets) or another known fastening device through the mounting aperture 310 of at least one of the mounting points 106A and 106B and securing said fastening device to a HPFP.

Each of the mounting points 106A and 106B includes a first stop face 108A and a second stop face 108B. In some embodiments, the mounting points 106A and 106B may include a cut-out 150 (or scallop) in the first stop face 108A and/or second stop face 108B to provide additional clearance for certain applications or fluid hose connections. In some embodiments, cut-out 150 may extend from the first stop face 108A and/or second stop face 108B into the mounting aperture 310 of mounting points 106A and 106B.

Bypass block 102 can include an integrally formed fuel barb 112. Because the bypass block 102 is rotatable relative to the collar 104, the fuel barb 112 can be oriented or placed in a plurality of locations between each of the mounting points 106A and 106B, allowing the fitment in nearly any engine bay configuration. This ability to orient/clock the fuel barb 112 for various engine configurations makes the rotatable bypass assembly 100 of the present disclosure nearly universal, readily adaptable across many applications and not limited to or directed to only a single application, a specific vehicle or a specific fuel system.

Because the bypass block 102 is rotatable relative to the collar 104, the fuel barb 112 (and combustion fuel supply passage 110 contained therein) of the bypass block 102 can be placed, rotated, or angled in any location or between the one or more stop faces (e.g., first stop face 108A and second stop faces 108B) located on the collar 104. In this way, the rotation of the bypass block 102 allows for use of the rotatable bypass assembly 100 of the present disclosure on a plurality of applications, including a plurality of high-pressure fuel pumps, vehicles, engines, and fuel systems. For instance, the exemplary embodiment of the rotatable bypass assembly 100 depicted in FIG. 1 can be used with a Bosch® CP4 high-pressure fuel pump, which can be found in various vehicles (e.g., Ford, GM, RAM, Jeep, BMW, VW, Audi, Porsche, and many forms of Industrial Equipment). However, it should be appreciated that the present disclosure is not limited to any particular style, model, or configuration of high-pressure fuel pump, high-pressure fuel system, vehicle, or engine.

Bypass block 102 of the rotatable bypass assembly 100 is rotatable relative to the collar 104. Bypass block 102 can be turned or rotated within or relative to collar 104, on or about an axis 148. Axis 148 extends in a vertical direction V through the center of both bypass block 102 and collar 104. Bypass block 102 may be rotated, relative to collar 104, about axis 148 until at least a portion of the fuel barb 112 comes into physical contact with the first stop face 108A or the second stop face 108B of one of the mounting points 106A or 106B. Because the bypass block 102 and collar 104 are not immovably affixed or joined to the other, bypass block 102 can be rotated, relative to collar 104, such that the fuel barb 112 rotates along the perimeter of the front edge 152 of the collar 104, between first stop face 108A of first mounting point 106A and first stop face 108A of second mounting point 106B. Similarly, because the bypass block 102 and collar 104 are not immovably affixed or joined to the other, bypass block 102 can be rotated, relative to collar 104, such that the fuel barb 112 rotates along the perimeter of the rear edge 154 of the collar 104, between second stop face 108B of first mounting point 106A and second stop face 108B of second mounting point 106B.

It should be appreciated that first mounting point 106A and second mounting point 106B are depicted in FIGS. 1-5 and 8, as being mirrored or directly opposed from one another across collar 104, based on a centerline which divides the collar into half, which can be a plane extending in a transverse direction T and vertical direction V, such that the angle of rotation of fuel barb 112 along the perimeter of the rear edge 154 of the collar 104 is less than 180 degrees and the angle of rotation of fuel barb 112 along the front edge 152 of the collar 104 is less than 180 degrees. However, in some embodiments of the present disclosure, the first mounting point 106A and second mounting point 106B may be located at other locations such that the angle of rotation of fuel barb 112 along either the perimeter of the rear edge 154 of the collar 104 or along the front edge 152 of the collar 104 is greater than 180 degrees.

In another exemplary embodiment of the present disclosure, collar 104 can include only a first mounting point 106A. In such an exemplary embodiment, because the bypass block 102 and collar 104 are not immovably affixed or joined to the other, bypass block 102 can be rotated, relative to collar 104, such that the fuel barb 112 rotates along the perimeter of the front edge 152 and the rear edge 154 of the collar 104, between first stop face 108A of first mounting point 106A and second stop face 108B of first mounting point 106A. In such an embodiment, the angle of rotation of fuel barb 112 along the perimeter of the rear edge 154 of the collar 104 and along the front edge 152 of the collar 104 is about 360 degrees. Because the bypass block 102 is rotatable relative to the collar 104, the combustion fuel supply passage 110 of the bypass block 102 can be placed, rotated, or angled in or between a plurality of locations, and the rotatable bypass assembly 100 can be used to prevent delivery of lubrication fuel or other unfiltered fuel (i.e., diesel fuel) to the pumping chamber of the HPFP, the common rail and/or fuel injectors of a high pressure fuel system without regard to the specific vehicle or application in which the high-pressure fuel system is located.

Referring again, generally, to FIGS. 1-8, combustion fuel supply passage 110 is a void, channel, or fluid passageway located within fuel barb 112. Combustion fuel supply passage 110 extends from an inlet 113 to a fuel reception chamber 122. Combustion fuel supply passage 110 receives combustion fuel from a fuel source (e.g., fuel tank). The fuel barb 112 includes one or more retention ridges 114, which extend outward in a radial direction from the fuel barb 112. The retention ridges 114 facilitate the attachment and retention of fuel hose (not show) carrying combustion fuel to bypass block 102, with said fuel hose carrying clean and/or filtered combustion fuel routed from a fuel source (e.g., fuel tank) directly to the fuel reception chamber 122 of bypass block 102. The delivery of said combustion fuel from the fuel reception chamber 122 to the engine (e.g., through the common rail and/or fuel injectors) is managed, at least in part, by fuel control actuator 202 (shown in FIGS. 2 and 3).

Bypass block 102 includes a fuel reception chamber 122 and fuel delivery nozzle 140. Fuel delivery nozzle 140 includes a sealing groove 142. Sealing groove 142 is a depression within fuel delivery nozzle 140. Sealing groove 142 can accommodate or hold an O-ring or other seal to create a fluid-tight connection or seal between fuel delivery nozzle 140 and the case of the high-pressure fuel pump (not shown) upon which the rotatable bypass assembly 100 is installed. Fuel delivery nozzle 140 also includes a fuel outlet passage 144, which allows combustion fuel to travel from fuel reception chamber 122 to the pumping chamber of the HPFP (not shown), common rail and/or injectors of the fuel system upon which the rotatable bypass assembly 100 is installed and/or being used. Fuel outlet passage 144 is a void, channel, or fluid passageway located within fuel delivery nozzle 140. Fuel outlet passage 144 extends, in a vertical direction V along axis 148, from inner chamber floor 124 to the nozzle outlet surface 146 of fuel delivery nozzle 140.

Fuel delivery nozzle 140 includes a barrier wall 147, which is located above, in a vertical direction V, sealing groove 142. Barrier wall 147 may be a cylinder surrounding fuel outlet passage 144. Barrier wall 147 can be a smooth surface which can form a liquid-tight seal against the case of the HPFP to block or obstruct the existing fuel supply passage (not shown and which is often an internal passageway within a HPFP, such as within the case of the HPFP) of a high-pressure fuel pump (e.g., a Bosch® CP4 pump) or otherwise stop, break, or interrupt the fluid communication existing between the fuel supply passage of a high-pressure fuel pump and, at least, the pumping chamber of the HPFP and/or the common rail of the high-pressure fuel system. In this way, the bypass block 102 of the present disclosure can be used avoid, stop, block, or prevent combustion fuel from mixing, being in fluid communication with and/or being contaminated by the lubricating fuel, without said lubricating fuel first being filtered by or passed through one or more filters.

It should be appreciated that in other exemplary embodiments of the present disclosure, it should be appreciated that other portions of the rotatable bypass assembly 100 of the present disclosure can form a liquid-tight seal against the case of the HPFP to block or obstruct the existing fuel supply passage (not shown and which is often an internal passageway within a HPFP, such as within the case of the HPFP) of a high-pressure fuel pump (e.g., a Bosch® CP4 pump) or otherwise stop, break, or interrupt the fluid communication existing between the fuel supply passage of a high-pressure fuel pump and, at least, the pumping chamber of the HPFP and/or the common rail of the high-pressure fuel system. This could include the collar 104, nozzle outlet surface 146, collar mounting protrusions 502 or block mounting protrusion 504.

The fuel reception chamber 122 is a void or cavity formed within the body 103 of bypass block 102, said void being defined by a top surface 116, an inner chamber wall 120 and an inner chamber floor 124 (shown FIGS. 4, 5, 8, 9) of bypass block 102. Fuel reception chamber 122 extends in a vertical direction V from top surface 116 to inner chamber floor 124. In the exemplary embodiments of the present disclosure depicted in FIGS. 1 through 8, the fuel reception chamber 122 is cylindrical, however it should be appreciated that fuel reception chamber 122 may be another shape or configuration which can receive a valve end 204 of a fuel control actuator 202 (shown in FIGS. 2 and 3).

Referring now to FIGS. 3 and 8. Bypass block 102 includes an outer wall 118. Outer wall 118 extends downward, in a vertical direction V, from a top surface 116 to block alignment surface 302. Collar 104 includes a collar alignment surface 304. When bypass block 102 is placed within collar 104, the block alignment surface 302 comes into rotatable physical contact with and rests on collar alignment surface 304, such that top surface 116 of bypass block 102 is level, in a vertical direction V, horizontal direction H and transverse direction T, with the top 306 of first mounting point 106A and/or second mounting point 106B. When top surface 116 of bypass block 102 is level with the top 306 of first mounting point 106A and/or second mounting point 106B, at least one mounting flange 206 of the fuel control actuator 202 can press across both top surface 116 and the top 306 of at least one of the top 306 of first mounting point 106A and/or second mounting point 106B, and thereby secure (by pressure, compression, or friction fit) the bypass block 102 and collar 104 to the high-pressure fuel pump upon which the rotatable bypass assembly 100 is being used. In this way the rotatable bypass assembly 100 is secured to the high-pressure fuel pump by being sandwiched between flange 206 of fuel control actuator 202 and the case or body of high-pressure fuel pump (not shown). Mounting of the rotatable bypass assembly 100 can be accomplished with a fastener (e.g., screws or bolts) placed through each flange hole 308 of the fuel control actuator 202, then said fastener can extend through at least one of the mounting apertures 310 of the first mounting point 106A or second mounting point 106B and said fastener being secured (e.g., screwed to) into the high-pressure fuel pump case or body. In this way, fasteners press the mounting flange 206 of the fuel control actuator 202 against top surface 116 of the bypass block and top 306 of mounting points 106A and 106B, such that the rotatable bypass assembly 100 is secured to a high-pressure fuel pump. Once secured to the high-pressure fuel pump in this manner, the bypass block 102 and collar 104 are secured in place by friction or press fit, such that bypass block 102 is no longer rotatable with respect to collar 104, unless said fasteners are removed or loosened.

Collar 104 also includes one or more collar mounting protrusions 502 at the bottom of the one or more mounting points 106A and 106B. Collar mounting protrusions 502 extend, in a downward vertical direction V, from the bottom surface 312 of collar 104. Collar mounting protrusions 502 correspond with one or more depressions (not shown) existing in a high-pressure fuel pump to prevent the collar 104 from moving about axis 148 relative to the high-pressure fuel pump.

Bypass block 102 includes a block mounting protrusion 504 which extends downward, in vertical direction V, from block alignment surface 302. Height of block mounting protrusion 504 is based, at least in part, on the height of collar mounting protrusions 502, the collar alignment surface 304 and block alignment surface 302. More specifically, the height of block mounting protrusion 504 is such that when bypass block 102 is placed within collar 104, and the block alignment surface 302 comes into rotatable physical contact with and rests on collar alignment surface 304, collar mounting protrusions 502 are level, in a vertical direction V, horizontal direction H and transverse direction T, with the block mounting protrusion 504.

Although specific features of various embodiments may be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotatable bypass assembly for use with a high-pressure fuel pump, the rotatable bypass assembly comprising:

a collar including a first mounting point, said first mounting point including a first stop face and a second stop face; and a bypass block including a fuel barb, wherein said fuel barb of the bypass block is rotatable between, at least, the first stop face and the second stop face.

2. The rotatable bypass assembly of claim 1 wherein the bypass block and the fuel barb are integrally formed.

3. The rotatable bypass assembly of claim 1 wherein the collar further comprises:

a second mounting point including a first stop face and a second stop face;

a front edge;

a rear edge; and wherein the fuel barb is rotatable along the front edge of the collar between the first stop face of the first mounting point and the first stop face of the second mounting point, and wherein the fuel barb is also rotatable along the rear edge of the collar between the second stop face of the first mounting point and the second stop face of the second mounting point.

4. The rotatable bypass assembly of claim 3 wherein the first mounting point and the second mounting point are opposed from one another across the collar.

5. The rotatable bypass assembly of claim 3, wherein the collar includes a collar alignment surface, and the bypass block includes a block alignment surface, wherein the collar alignment surface and the block alignment surface are in rotatable contact.

6. The rotatable bypass assembly of claim 5, wherein the bypass block includes a top surface and wherein the first mounting point and the second mounting point each form a protrusion extending from the collar, and wherein said first mounting point and said second mounting point each include a top; and wherein the top surface of bypass block is level with the top of, at least one of, the first mounting point or the second mounting point when the block alignment surface and the collar alignment surface are in rotatable contact.

7. The rotatable bypass assembly of claim 6, wherein the collar further comprises:

a bottom; and a collar mounting protrusion extending from said bottom.

8. The rotatable bypass assembly of claim 7, wherein the rotatable bypass block further comprises:

a fuel delivery nozzle in fluid communication with a fuel reception chamber, wherein the fuel reception chamber is located within the rotatable bypass block; and wherein the fuel delivery nozzle includes a barrier wall positioned above a sealing groove.

9. The rotatable bypass assembly of claim 8, wherein the barrier wall comprises a surface that is operable to form a liquid-tight seal against a case of a high-pressure fuel pump and is operable to obstruct an internal fuel supply passage located with the high-pressure fuel pump.

10. The rotatable bypass assembly of claim 9 further comprising:

a bypass block mounting protrusion extending from block alignment surface; and wherein the bypass block mounting protrusion is level with the collar mounting protrusion when the block alignment surface and the collar alignment surface are in rotatable contact.

11. The rotatable bypass assembly of claim 10 wherein the protrusion formed by the first mounting point further comprises a cut-out.

12. The rotatable bypass assembly of claim 11, wherein the cutout extends from the first stop face of the first mounting point into a mounting aperture located within the first mounting point.

13. The rotatable bypass assembly of claim 7 further comprising:

a fuel delivery nozzle in fluid communication with a fuel reception chamber; and wherein the fuel delivery nozzle includes a barrier wall positioned above a sealing groove.

14. A rotatable bypass block for use with a high-pressure fuel pump, the rotatable bypass block comprising:

a body including a top surface, a block alignment surface and an outer wall extending from the top surface to the block alignment surface;

a fuel reception chamber positioned in the body;

a fuel barb including a combustion fuel supply passage, wherein said combustion fuel supply passage is in fluid communication with said fuel reception chamber; and a fuel delivery nozzle in fluid communication with the fuel reception chamber, wherein the fuel delivery nozzle includes a barrier wall positioned above a sealing groove.

15. The rotatable bypass block of claim 14, wherein the barrier wall comprises a surface operable to form a liquid-tight seal against a case of a high-pressure fuel pump and operable to obstruct an internal fuel supply passage located with the high-pressure fuel pump.

16. The rotatable bypass block of claim 15, wherein the body of the bypass block, the fuel barb, and the fuel delivery nozzle are integrally formed.

17. The rotatable bypass block of claim 16 further comprising a bypass block mounting protrusion extending from block alignment surface.

18. The rotatable bypass block of claim 15, wherein the fuel reception chamber comprises a void that is operable to receive a valve end of a fuel control actuator.

19. The rotatable bypass block of claim 14, wherein the body of the bypass block comprises a cylinder.

* * * * *